Sept. 23, 1924.  
C. SCHAUB  
FLOOR NAILING MACHINE  
Filed June 13, 1923  
1,509,492  
5 Sheets-Sheet 1
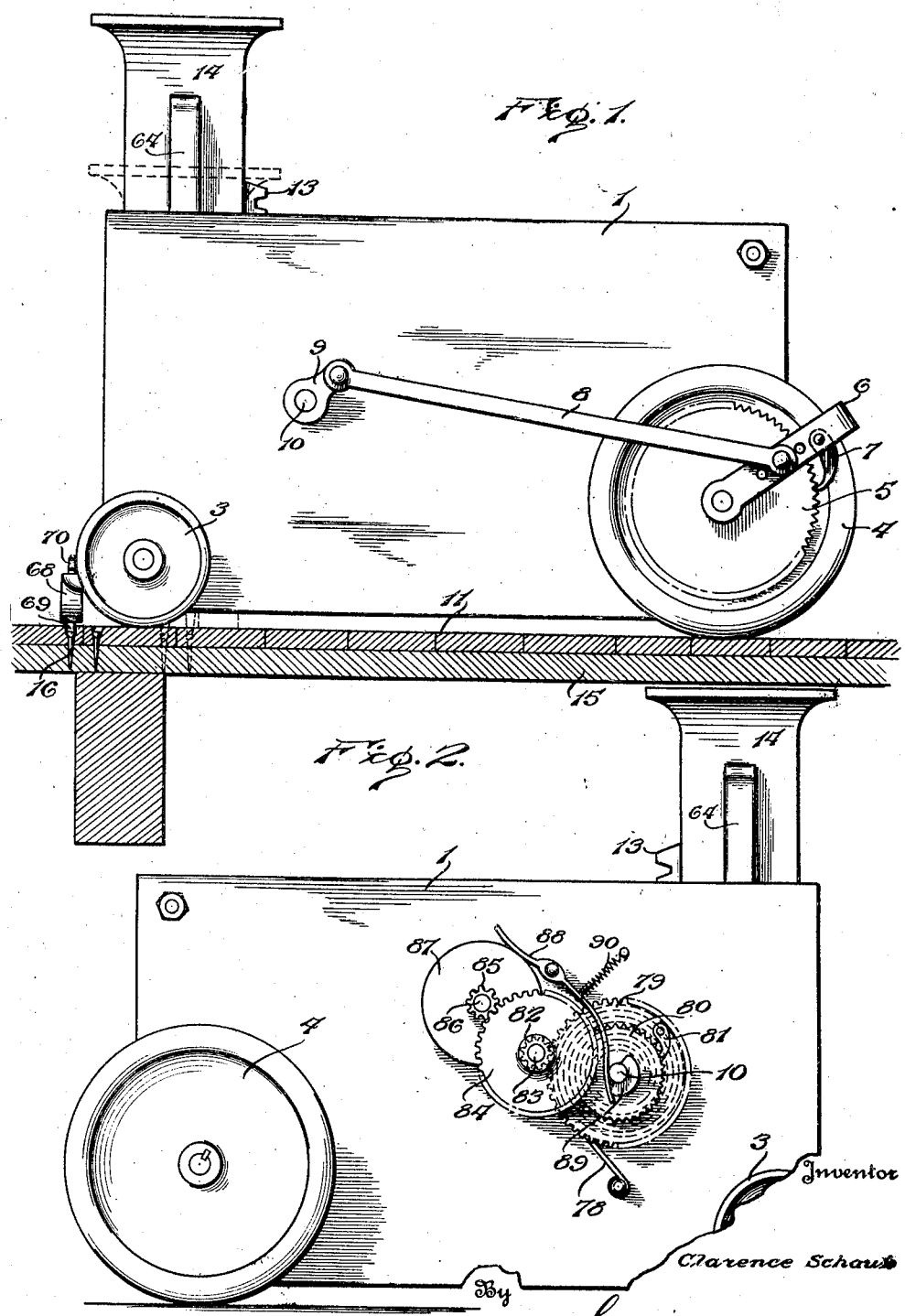

Sept. 23, 1924.  
C. SCHAUB  
FLOOR NAILING MACHINE  
Filed June 13, 1923  
1,509,492  
5 Sheets-Sheet 2

Inventor  
Clarence Schaub  
By Lacy & Lacy, Attorneys

Sept. 23, 1924.
C. SCHAUB
1,509,492
FLOOR NAILING MACHINE
Filed June 13, 1923
5 Sheets-Sheet 3
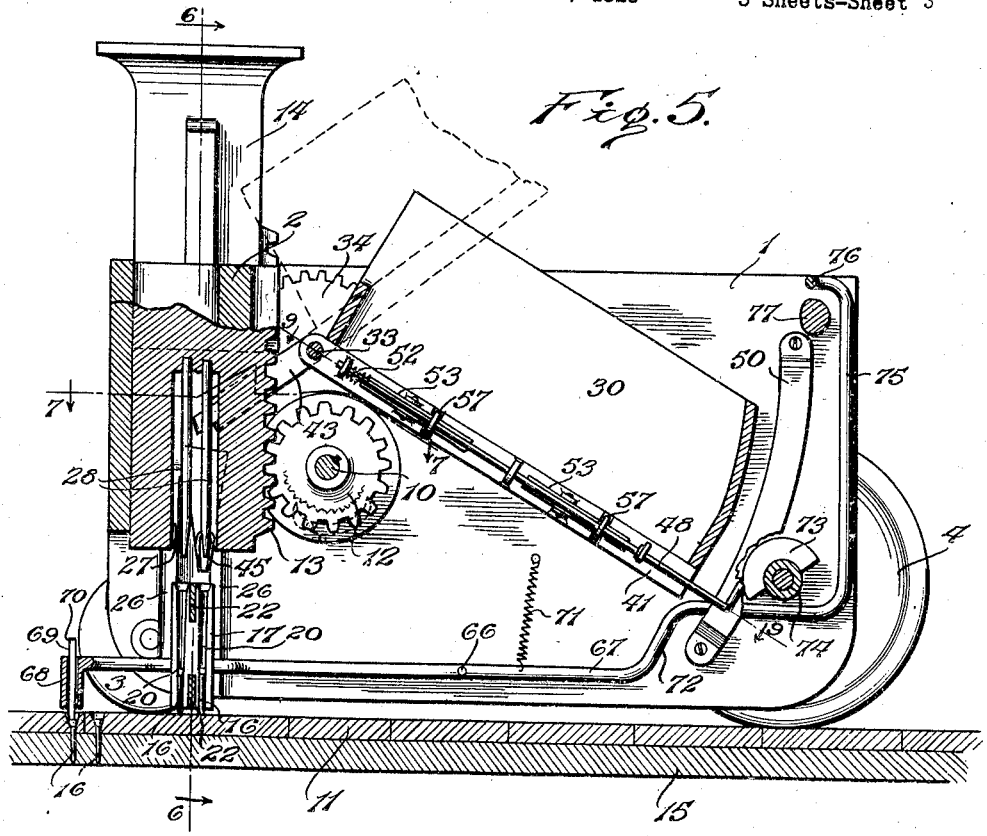
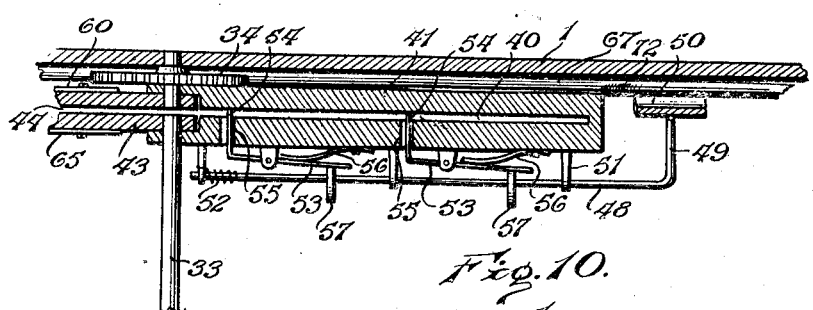
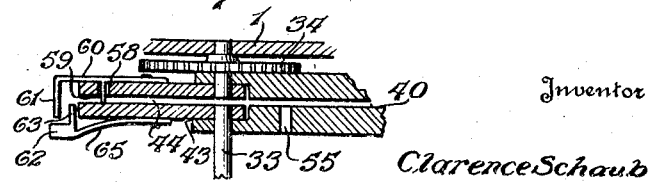
Inventor
Clarence Schaub
By
Lacey & Lacey, Attorneys

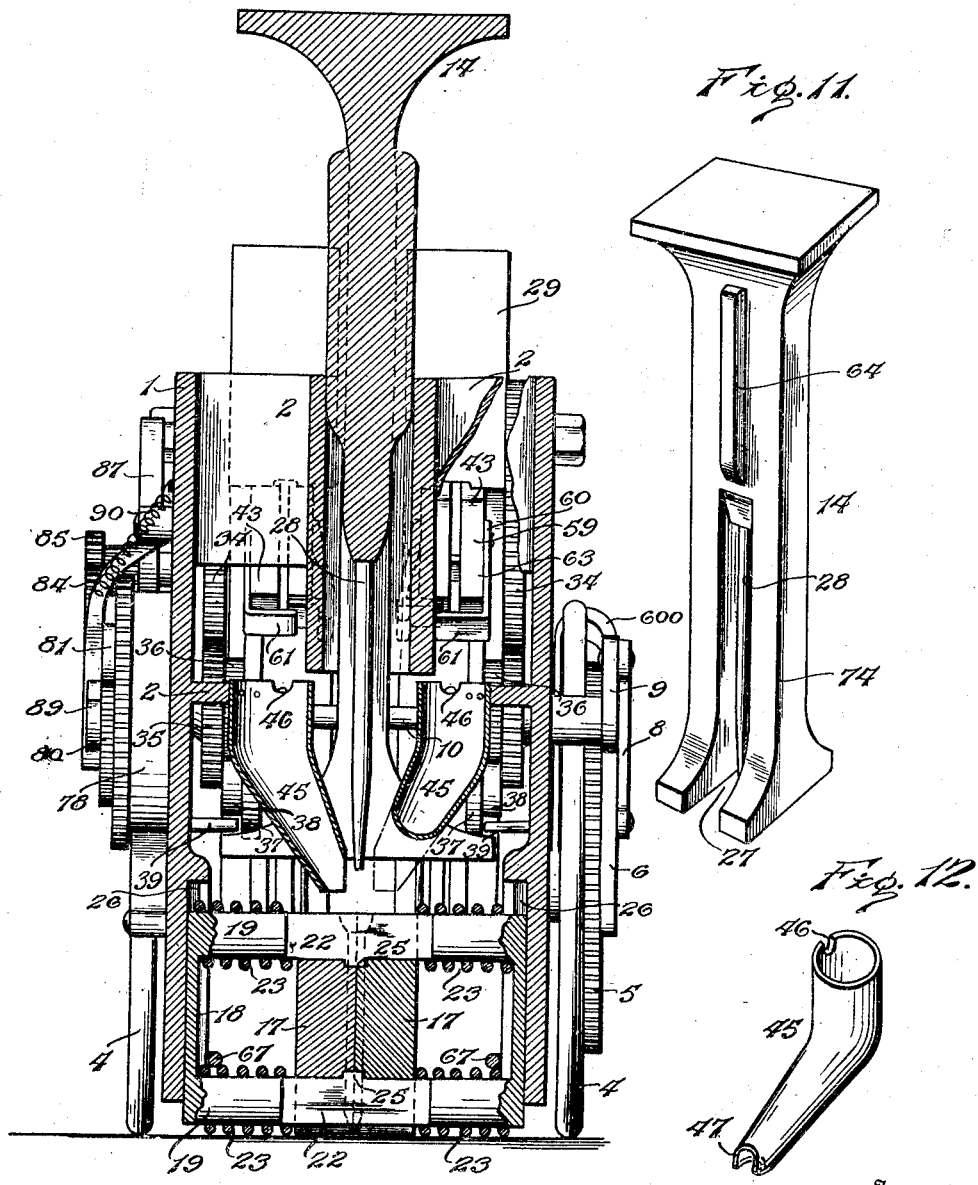

Sept. 23, 1924.
C. SCHAUB
FLOOR NAILING MACHINE
Filed June 13, 1923
1,509,492
5 Sheets-Sheet 5
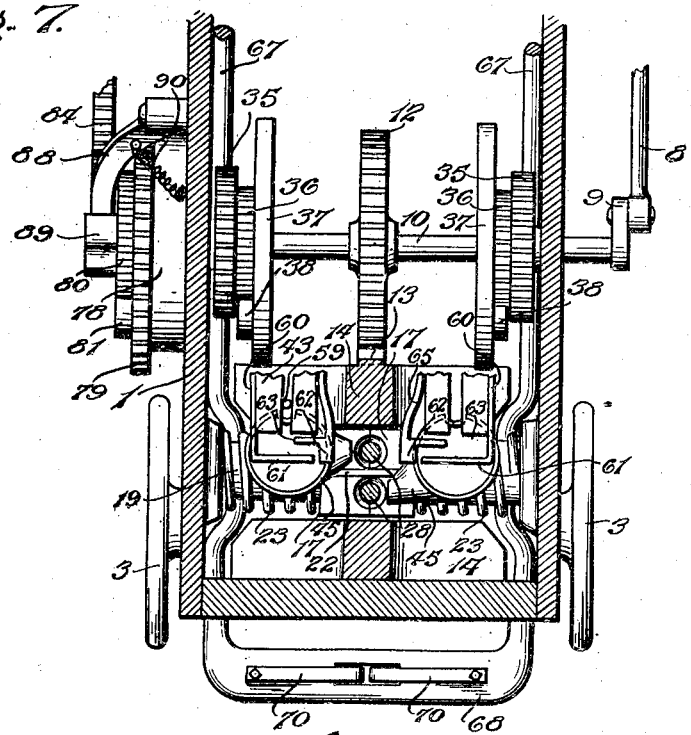
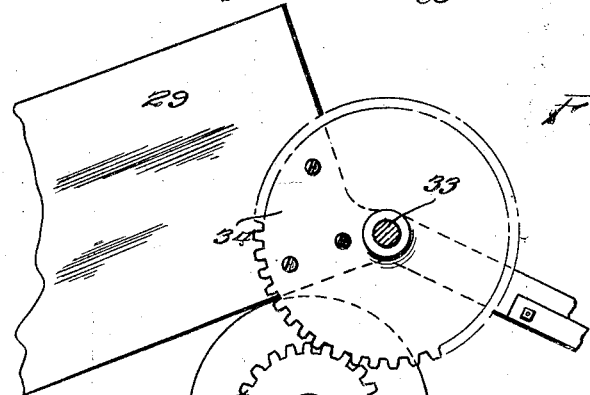
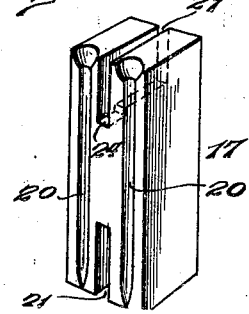
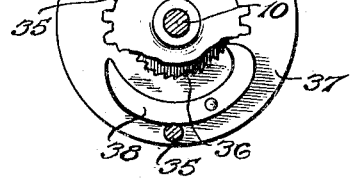
Inventor
Clarence Schaub
By Lacey & Lacey, Attorneys Patented Sept. 23, 1924.

1,509,492

UNITED STATES PATENT OFFICE.

CLARENCE SCHAUB, OF INDIANAPOLIS, INDIANA.

FLOOR-NAILING MACHINE.

Application filed June 13, 1923. Serial No. 645,104.

*To all whom it may concern:*

Be it known that I, CLARENCE SCHAUB, a citizen of the United States, residing at Indianapolis, in the county of Marion and State of Indiana, have invented certain new and useful Improvements in Floor-Nailing Machines, of which the following is a specification.

My invention is a partly automatic machine for nailing parquet floors which, under the influence of a manually given impulse, will drive the nails, feed additional nails to a position to be subsequently driven into the floor and effect travel of the machine a predetermined distance whereby it will be set for a second operation. The invention provides novel means for a effecting travel of the machine and arresting the travel at proper points for the application of nails to the floor; novel means for guiding the nails to the points at which they are to be driven; novel means for driving the nails, and also novel means for preventing clogging of the nails as they are fed to the point of use. The invention seeks to provide a machine including the stated features which will be compact in form and readily operable, which will be strong and durable, and which will not be apt to get out of order. One embodiment of the invention is illustrated in the accompanying drawings, and the invention resides in certain novel features which will be hereinafter first fully described and then more particularly pointed out in the appended claims.

In the drawings:

Figure 1 is a side elevation of my improved floor-nailing machine;

Fig. 2 is a similar view looking at the opposite side of the machine;

Fig. 5 is a longitudinal vertical section;

Fig. 6 is an enlarged transverse section on the line 6—6 of Fig. 5;

Fig. 7 is an enlarged horizontal section on the line 7—7 of Fig. 5;

Fig. 8 is an enlarged detail elevation of a portion of the mechanism for oscillating the nail box;

Fig. 9 is an enlarged detail section of part of the mechanism shown in Fig. 5, the section being taken on the line 9—9 of said figure;

Fig. 10 is a view similar to Fig. 9 and showing the means whereby the nails are fed into the delivery chutes;

Fig. 11 is a detail perspective view of the driver;

Fig. 12 is a detail perspective view of one of the chutes, and

Fig. 13 is a detail perspective view of a chuck or nail guide and holder.

Figure 3:
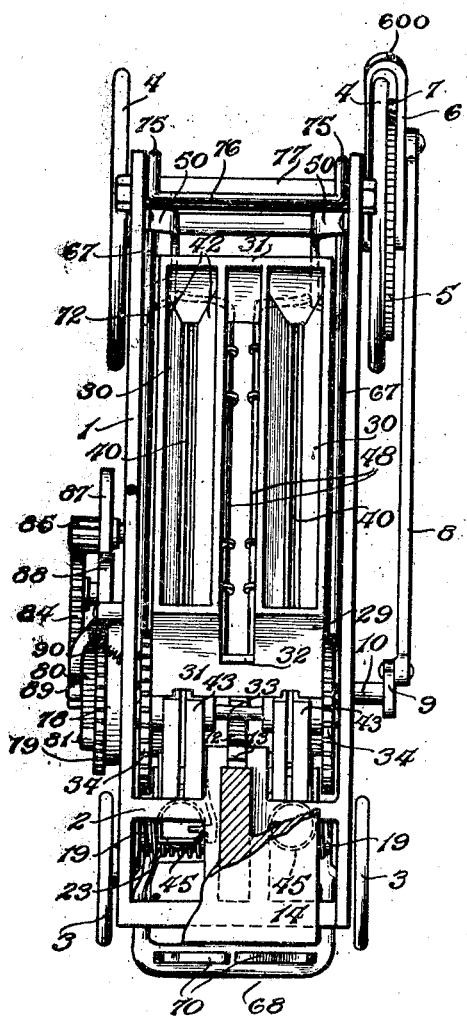
Fig. 3 is a plan view, with parts broken away and in section.
Figure 4:
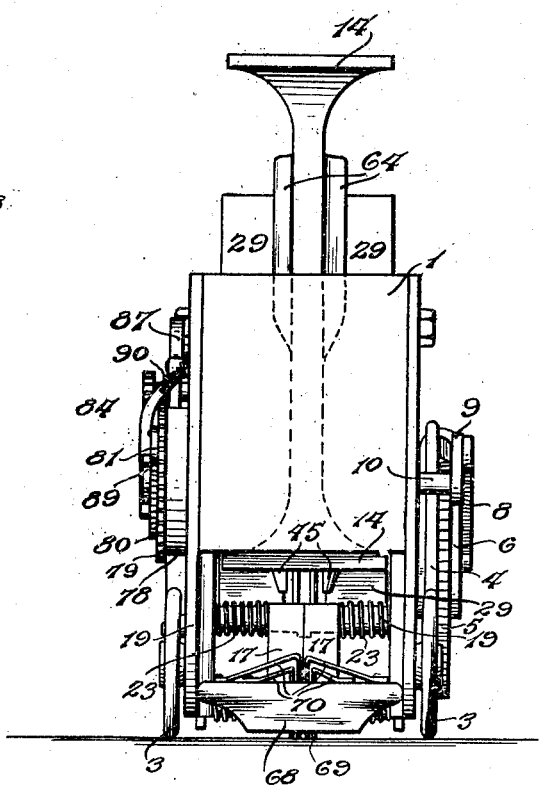
Fig. 4 is an end view with parts broken away and in section.

In carrying out my invention, I employ a housing 1 which is preferably rectangular in form and includes side plates and end plates, and an internal guide frame 2 disposed adjacent one end of the housing to guide and support the driver. The guide frame 2 may be formed integral with the side and end walls of the housing or may be formed separately therefrom and rigidly secured thereto, as may be preferred and as will be readily understood. The housing or frame is supported at its front end by small rollers 3 which may be mounted in any desired manner upon the sides of the housing, and at its rear end is supported by larger rollers or wheels 4 which are likewise mounted upon the sides of the housing, one of said rollers 4 having upon its outer side a ratchet wheel 5 which may be united with the roller in any preferred manner. Fitted loosely upon the axle of the roller 4 and, therefore, concentric with the ratchet wheel 5 is a crank arm 6, a pawl 7 being pivoted upon the said crank and adapted to engage the ratchet wheel and impart movement thereto when the crank is moved in one direction but to ride freely over the ratchet wheel when the crank is moved in the opposite direction. A link 8 is pivoted at its front end to the crank arm 6 and at its rear end to a crank 9 which is secured upon one end of the main driving shaft 10 which is disposed transversely in the housing and is journaled in the side walls of the same. It will be readily seen that, when rotation is imparted to the ratchet wheel by the action of the crank 6 and the pawl 7 as described, the machine will be caused to travel over the floor which is shown at 11. Midway between the sides of the housing, a gear wheel 12 is secured upon the shaft 10, and this gear wheel meshes with a rack 13 formed upon the front side of the driver 14, the driver being slidably engaged in and supported by the guiding frame 2, as shown. In the operation of the machine, a strong blow is delivered upon the upper end of the driver by a mallet or other tool so that the driver will be depressed and this downward movement of the driver causes the rack 13 to actuate the gear 12 and the shaft 10 so that the crank 9 will be rocked rearwardly and a corresponding movement imparted to the crank arm 6, the pawl 7 riding over the ratchet wheel 5 without actuating the same. Upon the upward movement of the driver, however, the parts will be moved in the opposite direction and the pawl 7 will then engage the ratchet wheel so as to actuate the same and impart rotation through it to the roller or supporting wheel 4 so that the machine will be caused to travel over the floor, and the distance through which it will travel may be determined by shifting the pivotal connection between the link 8 and the crank arm 6, as will be readily understood.

The parquet floor 11 is, as usual, laid upon a sub-floor, indicated at 15, and the travel of the machine, of course, is commensurate with the width of the boards composing the parquet floor. The nails, indicated at 16, are driven through the parquet floor into the sub-floor along the edges of the several boards of the parquet floor and are countersunk, the openings over the nails being filled with putty or similar material after the floor has been scraped and before the surface finish has been applied. To support the nails in position to be driven and to guide them while being driven, I provide chucks 17 which are mounted at the rear end of the housing within the same and are supported upon a frame consisting of vertical side members 18 and cross bars or beams 19 connecting said side members at the upper and lower ends thereof. The chucks are provided in pairs and they are provided in their opposed faces with vertical grooves 20 which receive the nails and support them vertically over the boards of the floor so that one nail will be disposed adjacent the edge of each abutting board. In the ends of the chucks are transverse vertically disposed grooves 21 which are engaged by the central flat-sided portions 22 of the cross bars 19 whereby the chucks will be maintained positively in an upright position, and the chucks are yieldably held together by springs 23 coiled around the said bars 19 between the side members 18 and the chucks, as shown most clearly in Fig. 6. The chucks are also provided at their inner edges and at the inner ends of the grooves 21 with notches or recesses 24 which are engaged by stop lugs 25 on the central flattened portions 22 of the bars 19 so that the chucks will be prevented from being pressed into binding engagement at their inner faces and will also be properly centered to receive the nails. The side members 18 of the chuck-carrying frame are fitted in guides 26 on the side walls of the housing so that a limited vertical movement of the frame will be permitted whereby the chucks may yield during the travel of the machine and will thereby avoid dragging or scraping upon the floor. When the machine is at rest, the weight of the chucks and the frame carrying them will hold the chucks to the floor so that the nails will be properly guided to the points where they are to be driven. The driver 14 is provided in its lower end with a vertically disposed recess or slot 27 whereby the driver may pass at opposite sides of the chucks on its downward stroke and within this recess I secure the nail sets 28 which are alined with the grooves 20 in the chucks and, therefore, arranged to enter the said grooves and deliver a driving blow upon the nails supported therein, the ends of the sets projecting slightly below the end of the driver so that the nails will be countersunk. It will be understood that, when the chucks are brought together, the opposed grooves 20 will register and thereby constitute sockets or chambers in which the nails will be supported in proper position to receive the driving blow from the nail sets, and it will also be understood that the machine will come to rest with the transverse central line of the chucks in the vertical plane of a joint between abutting boards of the floor 11 so that nails will be driven through the abutting boards simultaneously.

Within the housing, I provide a nail box 29 containing two longitudinally extending compartments 30, each of which is supplied with a quantity of nails loose therein. These compartments are connected rigidly at their ends by transverse walls 31, the rear wall 31 being centrally notched or recessed, as shown at 32, whereby it may clear the driver when the nail box is rocked, as will presently appear. The nail box is pivotally supported at its rear end upon a cross rod 33 which is secured in and extends between the side walls of the housing above the main shaft 10, as shown most clearly in Fig. 5. Concentric with its pivot 33, a gear wheel 34 is secured to each side of the nail box, and these gears mesh with gears 35 which are loose upon the shaft 10 adjacent the ends thereof. At the inner side of each gear wheel 35 is a ratchet wheel or disk 36, the said ratchets being fixed to the respective gear wheels in any convenient or preferred manner. Adjacent the ratches, disks 37 are fixed upon the shaft and each of said disks carries a dog 38 which is adapted to engage the respectively adjacent ratchet upon one movement of the shaft 10 but to ride freely over the same upon reverse movement of the shaft. During the downward movement of the driver, the pawl will ride freely over the ratchet but upon the upward movement of the driver the pawl will engage the ratchet and impart movement thereto and to the gear 35 so that the gear 34 will be rotated and the nail box thereby brought into the position shown in dotted lines in Fig. 5. When the nail box reaches the position shown in the dotted lines, the pawl 38 will ride against a stud 39 on the frame and will be thereby released from the ratchet so that the nail box will return by gravity to its initial position shown in full lines in Fig. 5. This rocking or oscillation of the nail box will obviously agitate the nails therein and they will be fed into the longitudinal slots 40 in the bottom of the nail box and defined by ribs 41 extending longitudinally of the nail box. The inner opposed faces of the side walls of the nail box are converged downwardly, as shown at 42, whereby the nails will be guided to the slots, means which will presently be described being provided to prevent the nails accumulating at the lower or closed ends of the slots when the nail box is in the lowered position. Extending downwardly from the pivot rod 33 and alined with the nail-receiving and guiding slots 40 are delivery spouts 43 which may have closed upper sides but are provided with longitudinal slots 44 in their bottoms, as shown most clearly in Figs. 9 and 10. The nails pass from the troughs defined by the ribs 41 and the slots 40 into the spouts 43 and drop from the lower ends of the said spouts into chutes 45 which may conveniently be secured to part of the guide frame 2, and are given the angular formation shown most clearly in Fig. 12 whereby the nails directed into the upper ends of the chutes will be caused to pass directly into the upper ends of the grooves 20 in the chucks 17. It may sometimes be desirable to provide notches 46 in the upper end edge of the chutes so as to avoid possible interference between the passing nails and the chutes, and I have illustrated such notches, but inasmuch as the delivery ends of the spouts 43 are disposed directly over the upper receiving ends of the chutes, such notches may, in most instances, be omitted. The delivery ends of the chutes are cut away, as indicated at 47, so as to provide easy clearance for the nail sets 28 and the lower portion of the driver, it being understood that the delivery ends of the chutes will be disposed within the recess or slot 27 of the driver, as clearly shown in Figs. 5 and 6. A rock shaft 48 is mounted in suitable bearings upon the inner side of each trough 41, and this rock shaft is provided at the forward end of the machine with a crank arm 49 adapted to ride upon a trip bracket 50 secured upon the side wall of the housing concentric with the pivot rod 33. The rock shaft is mounted in suitable bearings 51 upon the side of the trough and at its rear end is equipped with a torsional spring 52 acting constantly to hold the crank 49 toward the trip bracket 50, as will be readily understood. Mounted upon the side of the trough 41 are trip levers 53 each provided at its rear end with a finger 54 adapted to pass through an opening 55 in the side of the trough and extend across the same, as shown most clearly in Fig. 9. A spring 56 co-operates with each trip lever 53 to hold the finger 54 normally across the trough and a cam 57, secured upon the rock shaft 48, acts upon each adjacent lever in opposition to the respective spring. When the nail box is in its lowest position, the crank arm 49 bears upon the trip bracket 50 and the low parts of the cams 57 are presented to the trip levers 53 so that the fingers 54 extend across the nail-receiving troughs and prevent the nails sliding to the low end thereof and clogging the action of the machine. As the nail box is raised, the crank 49, of course, rides upon the trip bracket 50 to the upper end of the same and when the box reaches the horizontal position the crank will clear the end of the bracket, whereupon the spring 52 will operate to rock the shaft 48 and cause the cams 57 to bear upon the trip levers 53 so that they will be rocked and the fingers 54 withdrawn from the troughs 41. As the upward movement of the nail box continues, the nails within the trough may then slide toward and through the then lower ends of the same and enter the respective spouts 43 in an obvious manner. To control the discharge of the nails from the spouts 43, I provide the devices shown in Fig. 10. In the outer side wall of each spout is an opening 58 through which projects a finger 59 on a spring arm 60 which is secured upon the side of the spout and projects beyond the end of the same. A second finger 61 is carried by the free end of this spring arm and is adapted to be engaged by the head 62 of a pusher arm consisting of a spring 65 secured upon the inner side of the spout 44. Immediately adjacent the head 62, the pusher is provided with a stop finger 63 which may project across the open end of the spout 44. Upon the side of the driver, in the upper portion thereof, is a projection 64 which, upon the downward movement of the driver, rides against the pusher arm 65 and forces the head 62 inwardly so that the finger 63 will extend across the open end of the spout 44 and the head will engage the finger 61 and push the same aside so that the finger 59 will be withdrawn from the spout. The space between the finger 59 and the end of the spout is just sufficient to accommodate one nail so that, when the finger 59 is pushed aside, one nail will be admitted to the end of the spout and will be held there by the finger 63. On the up movement of the driver, the projection 64 will release the pusher arm 65, whereupon the finger 63 will be withdrawn, and the nail held thereby will drop into the subjacent chute 45 and thence pass to the proper groove 20 in the chucks. Simultaneously with the withdrawal of the finger 63, the stop arm 60 will return to its initial position so that the finger 59 will again extend across the spout and the travel of the nails will be again arrested.

Pivotally mounted, as at 66, upon the inner side of each side wall of the housing 1 is a side member 67 of a substantially U-shaped frame, the rear ends of these members 67 projecting beyond the end of the housing and carrying a stop block or a head 68. Fitted loosely in this head at and adjacent the center thereof are a plurality of vertical stop pins 69 which are held normally depressed by weak springs 70 secured at their outer ends upon the head 68 and having their inner ends engaged with the stop pins. A relatively strong spring 71 is connected to one of the members 67 and to the side wall of the housing and tends constantly to hold the head 68 in contact with the floor. As the machine travels over the floor, the head 68 will trail behind the nail-driving instrumentalities and, when the head is brought into position over the last driven nails, one of the stop pins 69 will at once drop into the countersink left over one of said nails and will thereby arrest the travel of the machine so that the nail-driving elements will be in proper position to drive a second pair of nails. One side arm 67 has its forward end portion stepped upwardly, as at 72, so that it may pass through the trip bracket 50 in position to be acted upon by a cam 73 which is provided on a sleeve 74 enclosing the axle of the forward wheels or rollers 4 between the sides of the main housing. The crank arm 6 is carried over the periphery of the adjacent wheel 4, as at 600, the crank being U-shaped, as shown clearly in Figs. 3 and 6, and the sleeve 74 being fixed to the inner end of the crank. When the crank is swung forwardly on the down stroke of the plunger, the cam 73 bears upon the adjacent member and rocks the same so that the head 68 will be lifted and the stop pin 69 withdrawn from the countersink engaged by it. The machine will then be free to travel and will travel under the influence of the mechanism provided for that purpose. It frequently becomes necessary or desirable to shift the machine out of a straight path so that nails may be driven into the boards at the ends of the same and this shifting must, of course, be performed manually. In order that this may be done, I extend the front ends of the side members 67 upwardly, as shown at 75, and connect the upper ends of the vertical portions 75 by a cross member or bridge piece 76 which is disposed immediately above a cross brace or handle bar 77 which is secured to and extends between the upper forward corners of the side walls of the housing. When the machine is to be thus shifted, the operator will grasp the handle bar 77 and in doing so will exert a downward pressure upon the bridge piece 76 carrying the same against the handle bar. The side members 67 will be thereby rocked against the tension of the spring 71, and the head 68 with the stop pins 69 will be lifted from and held out of contact with the floor. The machine may then be easily shifted out of the straight line so that the nails may be driven through alined boards at the joint between the same.

As hereinbefore stated, the driver is given a downward movement by a blow from a mallet or other tool. This downward movement of the driver winds a spring which, by its unwinding, imparts a return movement to the driver and actuates the other working parts. The shaft 10 projects through both sides of the housing 1 and at that side of the housing remote from the crank 9 a spring 78 is disposed in volute form about the shaft and is secured at one end to the shaft and at its opposite end to the side of the housing. A gear wheel 79 is fitted loosely upon the shaft at the side of the spring 78 and at the outer side of this gear wheel a ratchet wheel 80 is fixed upon the shaft, the gear wheel being equipped with a pawl 81 which is adapted to engage the ratchet wheel so that the movement of the same in one direction will be imparted to the gear wheel. Upon the down stroke of the driver, the spring will be wound and the ratchet wheel will ride under the pawl 81 without imparting motion to the gear wheel but on the reverse movement of the driver under the influence of the unwinding spring, the ratchet wheel will engage the dog and rotation will be then imparted to the gear wheel. The gear wheel 79 meshes with a pinion 82 which is mounted upon a stub shaft 83 on the side of the housing and which also carries a gear 84, the latter gear meshing with a pinion 85 which is fixed to a shaft 86 carrying a brake disk 87. A brake lever 88 is fulcrumed intermediate its ends upon the side of the housing and has one end disposed to bear upon the edge of the brake disk 87 and its other end arranged in operative relation to a cam 89 carried upon the adjacent end of the shaft 10, a spring 90 being secured to the housing and to the brake lever so as to hold the lower end thereof in position to be actuated by the cam, as clearly shown in Fig. 2.

As is well known, parquet floors are secured by nailing to a sub-floor, the nails being driven at equi-distant points along the edges of the parquet flooring strips. The machine is driven across the boards so as to drive the nails in one line across the flooring and is then manually shifted laterally so as to drive another row of nails. At the start of operations, the nail-guiding and holding troughs at the bottom of the nail box may be manually filled with nails disposed therein with their points downward and nails to be driven may be manually placed in the chucks. Upon the down stroke of the driver, the nail sets will be carried through the grooves or channels in the opposed faces of the chucks and the nails will be driven into and through the flooring and countersunk therein. The downward movement of the drive actuates the gear 12 so that the shaft 10 is rotated and the spring 78 is wound. When the force of the blow has been spent, the spring at once starts to unwind and imparts reverse motion to the shaft 10, thereby acting directly upon the driver so as to raise the same. The reverse movement of the shaft 10 actuates the crank 9, the link 8 and the crank arm 6 to rotate the forward rollers or wheels 4 so that the machine will be caused to travel over the floor a distance equal to the width of the parquet flooring strips. When the driver descends, the stop head 63 is raised, as before stated, so that the stop pins 69 are withdrawn from the floor and the machine may then travel uninterruptedly until the stop pins have passed over the board just nailed and drop into engagement with the second nail of the board, the cam 73 holding the head 68 raised during an interval sufficient to permit the pin 69 to clear the countersink immediately adjacent the one in which it was engaged. The downward movement of the driver, as previously stated, will also force the stop finger 63 across the end of the spout 44 and the projection 64 upon the driver will remain in engagement with the head 62 until the driver has just about completed its upper stroke whereupon the said head will be released and the nail engaged by it may drop into the chute 45 and thence pass to the chucks and be held thereby in position to be driven home. The upward movement of the driver is, of course, coincident with a reverse movement of the gear 34, under the influence of the unwinding spring and the gear 35 which is then rendered operative by the engagement of the dog 38 with the ratchet 36, and the nail box will be consequently raised. The dog 38 will, at or prior to the completion of this lifting movement of the nail box, ride upon the stud or pin 39 and will thereby be released from the ratchet wheel 36, whereupon the nail box will at once drop to its initial position, this descent of the nail box causing some of the nails to be jolted into the troughs 41 at the bottom of the box. During the upward movement of the nail box, some of the nails, of course, slide into the chute 44. Normally, the brake lever 88 bears upon the brake disk 87 and holds the same against movement. When the ratchet disk 80 is rotated by the downward movement of the driver and the consequent rotation of the shaft 10, the cam 89 is caused to bear upon the said lever and release it from the brake disk which is then free to revolve. Upon reverse movement of the shaft under the influence of the unwinding spring, the brake lever will be held out of contact with the brake disk for the major portion of the movement and as the movement approaches its end, the lever will be released so as to bear upon the brake disk and thereby retard and arrest the movement of the parts. This mechanism, therefore, provides for an even steady operation under the influence of the spring and serves to conserve the energy of the spring so that it will not be expended instantly and thereby impart such rapid movement to the working elements as to break or otherwise damage any of them. The gear 12 and the rack 13 should be so proportioned to obtain the best results that the gear will not make more than one-half a revolution and while I have shown a complete gear, it may be merely a segment or curved rack without affecting the operation or the utility of the machine.

My apparatus is very compact and may be used in a restricted space. The parts are simple in their construction and operate readily so that the force required to actuate the machine need not be greater than that required when driving the nails by hand. By the use of my machine, however, the operator is relieved of the fatigue due to kneeling upon the floor and crawling over the same as the work progresses while the nailing operation is effected much more rapidly than it could be done by hand. Moreover, the supply of nails is carried by the machine in such manner that loss of the same cannot occur and the nails are always available when needed.

Having thus described the invention, what is claimed as new is:

1. In a floor-nailing machine, the combination of a housing, a nail support mounted in the housing, a stop mechanism carried by the housing and adapted to hold the same at a point where a nail is to be driven, a driver co-operating with the nail support, and means actuated by the driver for releasing the stop device to permit travel of the housing.

2. In a floor-nailing machine, the combination of a housing, a nail support mounted in the housing, a driver co-operating with the nail support to drive a nail held therein, a stop device for arresting travel of the housing and holding the same at a point where a nail is to be driven, means controlled by the driver for releasing said stop device, and means controlled by the driver to effect travel of the housing.

3. In a floor-nailing machine, the combination of a housing, a nail support mounted in the housing, a driver co-operating with the nail support to drive a nail held therein, a frame pivotally mounted in the housing, a stop on said frame, and means controlled by the driver to rock the frame and thereby release the stop to permit travel of the housing.

4. In a floor-nailing machine, the combination of a housing, a nail support mounted in the housing, a frame pivotally mounted in the housing, a stop head carried by said frame adjacent the rear end of the housing, a stop yieldably fitted in said head and adapted to engage an opening in which a nail has been driven whereby to hold the housing in position to permit driving of a second nail, means acting on the frame for normally holding the stop in active position, and means whereby said frame may be actuated to release the stop.

5. In a floor-nailing machine, the combination of a housing, a nail support mounted in the housing, a driver co-operating with the nail support to drive a nail held therein, a frame pivotally mounted in the housing, a stop head carried by said frame adjacent one end of the housing, stop pins mounted vertically in said head, yieldable means for holding said pins in lowered position, a handle bar at the forward end of the frame, and an element on the first-mentioned frame arranged adjacent and adapted to be pressed to said handle bar whereby to release the stop pins and permit travel of the housing.

6. In a floor-nailing machine, the combination of a nail support, a driver co-operating with said support, a main shaft, means whereby said shaft will be rotated by a downward movement of the driver, a spring connected with said shaft and wound by and during the downward movement of the driver, a nail box mounted adjacent the driver for vertical rocking movement, means to be driven from the main shaft for raising the nail box, means whereby said means will be operatively connected with the main shaft when the spring unwinds, and means for releasing said means at the upper limit of movement of the nail box.

7. In a floor-nailing machine, the combination of a nail support, a driver co-operating with the nail support, a motor spring, means whereby said spring will be wound by and during the downward movement of the driver, means whereby the unwinding of the spring will raise the driver, a brake disk operatively connected with said spring to be actuated by the unwinding of the same, a brake lever normally engaging the brake disk, and a cam bearing upon said lever and adapted to release the same from the brake disk during the major portion of the unwinding action of the spring.

In testimony whereof I affix my signature.

CLARENCE SCHAUB. [L. S.]